United States Patent
Gal et al.

(10) Patent No.: US 7,075,048 B2
(45) Date of Patent: Jul. 11, 2006

(54) OMNI-DIRECTIONAL RADIATION SOURCE AND OBJECT LOCATOR

(75) Inventors: Ehud Gal, Reut (IL); Reuven Eyal, Ramat HaSharon (IL); Gil Graisman, Reut (IL); Gennadiy Liteyga, Ashkelon (IL)

(73) Assignee: Wave Group Ltd., Tel Aviv (IL)

( * ) Notice: Subject to any disclaimer, the term of this patent is extended or adjusted under 35 U.S.C. 154(b) by 0 days.

(21) Appl. No.: 11/069,067

(22) Filed: Mar. 1, 2005

(65) Prior Publication Data
US 2005/0167570 A1 Aug. 4, 2005

Related U.S. Application Data

(63) Continuation of application No. 10/471,958, filed as application No. PCT/IL02/00228 on Mar. 20, 2002, now abandoned.

(60) Provisional application No. 60/276,933, filed on Mar. 20, 2001, provisional application No. 60/322,737, filed on Sep. 18, 2001.

(51) Int. Cl.
*B64G 1/36* (2006.01)
(52) U.S. Cl. .................................. 250/206.1; 244/171
(58) Field of Classification Search ............. 250/206.2, 250/203.6, 559.31, 206.1; 224/171
See application file for complete search history.

(56) References Cited

U.S. PATENT DOCUMENTS 6,026,337 A * 2/2000 Krigbaum et al. ....... 250/203.6
6,450,455 B1 * 9/2002 Davis ......................... 244/171

* cited by examiner

*Primary Examiner*—Thanh X. Luu
*Assistant Examiner*—Tony Ko
(74) *Attorney, Agent, or Firm*—Marsteller & Associates, P.C.

(57) ABSTRACT

A method for determining azimuth and elevation angles of a radiation source or other physical objects located anywhere within an cylindrical field of view makes use of an omni-directional imaging system comprising of reflective surfaces, an image sensor and an optional optical filter for filtration of the desired wavelengths. The imaging system is designed to view an omni-directional field of view using a single image sensor and with no need for mechanical scan for coverage of the full field of view. Use of two such systems separated by a known distance, each providing a different reading of azimuth and elevation angle of the same object, enables classic triangulation for determination of the actual location of the object. The invention is designed to enable use of low cost omni-directional imaging systems for location of radiation sources or objects.

12 Claims, 3 Drawing Sheets

OMNI-DIRECTIONAL RADIATION SOURCE AND OBJECT LOCATOR

REFERENCE TO RELATED APPLICATIONS

This application is a continuation of U.S. patent application Ser. No. 10/471,958, filed Sep. 16, 2003 now abandoned, which is a National Phase Application of PCT Patent Application No. PCT/IL02/00228 filed Mar. 20, 2002 and which is entitled "OMNI-DIRECTIONAL RADIATION SOURCE AND OBJECT LOCATOR", the contents of which are incorporated by reference. PCT Patent Application No. PCT/IL02/00228 claims priority from U.S. Provisional Patent Application Nos. 60/276,933 and 60/322,737 which were filed on Mar. 20, 2001 and Sep. 18, 2001 respectively.

FIELD OF THE INVENTION

The invention relates generally to omni-directional imaging. More specifically but not exclusively, it relates to the field of determining a location of radiation sources and objects by using omni-directional imaging systems.

DESCRIPTION OF RELATED ART

The present invention refers to a method for detection and for determining a location of radiation sources and physical objects in a cylindrical field of view. Radiation source detection systems are widely used, mostly for military purposes. Current techniques are based on employment of an imaging device with a focal plane array that is sensitive to a specific range of wavelength, thus enabling detection of energy radiated in this wavelength range. Detection of a radiation source is done by detection of changes on the focal plane array —changes that occur only if a ray of the defined wavelength range penetrates the optical filter and comes into contact with the focal plane array. Determination of the position (azimuth and elevation angles) of the radiation is based on registration of each pixel's elevation and azimuth. Employment of two such systems, each detecting the same radiation source and each producing a different azimuth and elevation angle enable determination of the radiation source's exact location by classic triangulation methods.

The above-mentioned method is currently used with imaging systems which are able to cover only a relatively narrow field of view. Therefore, in order to cover a field of view that is wider than the field of view covered by the imaging system, it is customary to use several imaging systems, each of which covers a different field of view. The use of several imaging systems in such a solution necessitates accurate alignment of the systems to assure that each of them covers a different sector with no gaps or overlaps, and that all the systems together cover the full panoramic view. It is also required that advanced synchronized software will support all imaging devices and provide accurate readings and calculation of the azimuth and elevation of the illuminating source. Due to its complexity this method is considered cumbersome and costly.

Another method commonly used is rotating a conventional system about its axis to achieve coverage of a full panoramic field of view. Rotation of such a system requires combination of smoothly moving mechanical components which are accurately controlled and synchronized with the software's operation to assure accurate determination of azimuth and elevation angles of the illuminating source.

The current invention provides a static staring imaging system that enables coverage of a full panoramic or nearly spherical field of view, without mechanical movement or the need for multiple imaging systems.

SUMMARY OF THE INVENTION

A first embodiment of the current invention provides a method for determining an elevation angle of an object imaged by a focal plane array sensor. The focal plane array sensor is part of a focal plane array that images an omni-directional field of view. The method comprises the following stages:
  a. Imaging a cylindrical field of view using an omni-directional imaging system comprising an omni-directional lens assembly and a focal plane array.
  b. Detection of an object imaged by a first sensor element on the focal plane array.
  c. Registration of the coordinates of the first sensor element relative to its position on the focal plane array.
  d. Registration of the coordinates of a second sensor element which occupies the center of the entire image, relative to its position on the focal plane array.
  e. Determination of the distance between the first sensor element and the second sensor element.
  f. Determination of a transformation function, which assigns each said distance the appropriate elevation angle value, and which is compatible to the design of the omni-directional imaging system.
  g. Extraction of elevation angle value which corresponds to the distance value from the transformation function.

Preferably, said omni-directional lens assembly, which is a part of the omni-directional imaging system, comprises reflective lenses, which create a reflection of the omni-directional field of view towards the focal plane array.

The method may further incorporate placement of an optical filter anywhere along the optical path of light rays that are captured by the omni-directional imaging system. The optical filter is selected to insure filtration of specific wavelengths.

The object that is detected by the omni-directional imaging system may be a radiation source. The radiation source may emit radiation in the visible or invisible wavelength spectrums.

Preferably, detection of the object or the radiation source on the focal plane array is accomplished by software processing of the image that is captured by the focal plane array.

Preferably, detection of the object on the focal plane array is accomplished by employment of an electronic circuit, which is connected to the focal plane array.

Preferably, the electronic circuit is designed to detect charge changes on the focal plane array and register the coordinates of the sensor elements on which changes have been detected.

A Second embodiment of the current invention provides a method for determining azimuth angle of an object imaged by a focal plane array sensor. The focal plane array sensor is part of a focal plane array that images an omni-directional field of view. The method comprises the following stages:
  a. Imaging a cylindrical field of view using an omni-directional imaging system comprising an omni-directional lens assembly and a focal plane array.
  b. Detection of an object imaged by a first sensor element on the focal plane array.
  c. Registration of the coordinates of the first sensor element relative to its position on the focal plane array.

d. Registration of the coordinates of a second sensor element which occupies the center of the entire image, relative to its position on the focal plane array.

e. Determination of the distance between the first sensor element and the second sensor element.

f. Superposition of a virtual two dimensional coordinate system upon the focal plane array, in a way that the origin of the coordinate system coincides with the second sensor element.

g. Alignment of one of the axes of the coordinate system with true north.

h. Determination of the angle between the line connecting the first sensor element with the second sensor element and the axis aligned with true north, the angle being the azimuth angle.

Preferably, omni-directional lens assembly, which is a part of the omni-directional imaging system, comprises reflective lenses, which create a reflection of the omni-directional field of view towards the focal plane array.

The method, may further comprise placement of an optical filter anywhere along the optical path of light rays that are captured by the omni-directional imaging system. The optical filter is selected to insure filtration of specific wavelengths.

The object that is detected by the omni-directional imaging system may be a radiation source. The radiation source may emit radiation in the visible or invisible wavelength spectrums.

Preferably, detection of the object or the radiation source on said focal plane array is accomplished by software processing of the image that is captured by the focal plane array.

Preferably, detection of the object on the focal plane array is accomplished by employment of an electronic circuit, which is connected to the focal plane array.

Preferably, said electronic circuit is designed to detect charge changes on the focal plane array and register the coordinates of the sensor elements on which changes have been detected.

The embodiments described hereinabove enable determination of azimuth and elevation angles of objects or radiation sources in the visible or invisible spectrums, which are located in a cylindrical field of view, reflected towards a focal plane array by a lens assembly comprises reflective lens or a plurality of lenses, and detected on the focal plane array.

BRIEF DESCRIPTION OF THE DRAWINGS

For a better understanding of the invention and to show how the same may be carried into effect, reference will now be made, purely by way of example, to the accompanying drawings. With specific reference now to the drawings in detail, it is stressed that the particulars shown are by way of example and for purposes of illustrative discussion of preferred embodiments of the present invention only, and are presented to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

The preferred embodiments of the current invention provide methods for determining the azimuth and elevation angles of a radiation source or object located in a cylindrical field of view and imaged by a Focal Plane Array (FPA) of an omni-directional imaging device. The following detailed description will refer, in brief, to the structure of a few omni-directional imaging devices.

It is stressed, that although only several structures are demonstrated, the method of determining the azimuth and elevation angles of an object imaged by these systems described hereinbelow, is applicable to many other forms and structures of omni-directional imaging devices that use reflective surfaces. Therefore the incorporation of figures and references to specific models of omni-directional imaging devices is done purely by way of example, and should not be considered as limiting the extent of this invention.

Figure 1:
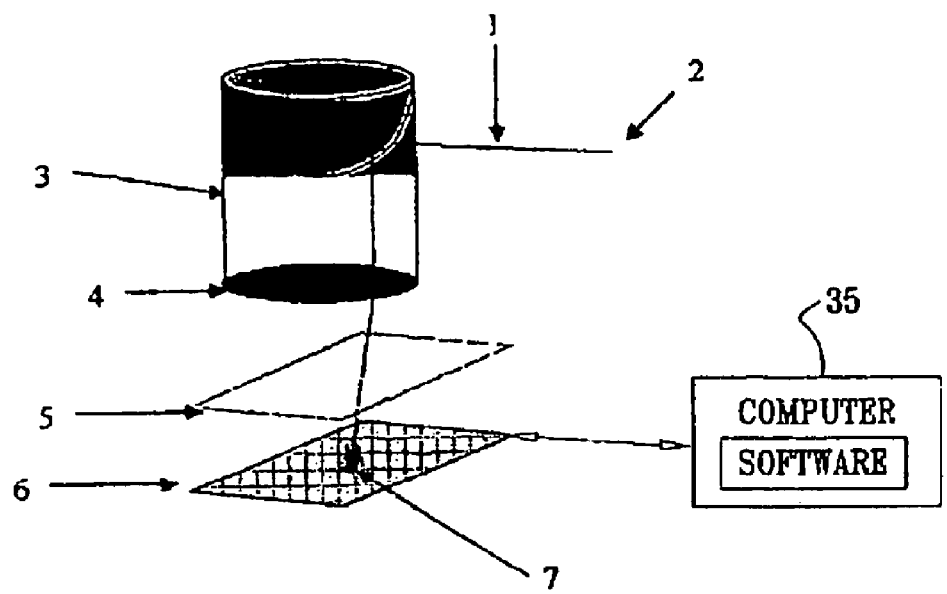
FIG. 1 is a schematic illustration of an imaging device which provides a cylindrical field of view, and of the optical path of a light beam traveling within the imaging device.

FIG. 1 demonstrates detection of radiation (1), originating at a radiation source (2). The radiation (1) is reflected from an omni-directional mirror assembly (3) towards a focusing lens (4), an optical filter (5) and a Focal Plane Array (6). Said omni-directional mirror assembly (3) contains one or more reflective surfaces and is designed to enable a panoramic field of view. It is stressed that alternative designs are possible for panoramic lens assemblies. Each such design may enable a full panoramic view at different elevation and depression angles, and specific designs can be determined according to the desired applications and needs. It is further stressed that the optical filter may be matched to wavelengths of radiation of interest. The optical filter may be employed anywhere along the optical path of the radiation as long as it is positioned before to the Focal Plane Array. The radiation (1) is detected by one or more sensor elements (7) on the Focal Plane Array (6), for example by one or several pixels on a Charged Couple Device (CCD). The actual detection of a light beam may be done by employment of an electronic circuit, connected to the Focal Plane Array and designed to detect charge changes or by means of software, employed by a computer (35), that examines or processes the output image.

Figure 2:
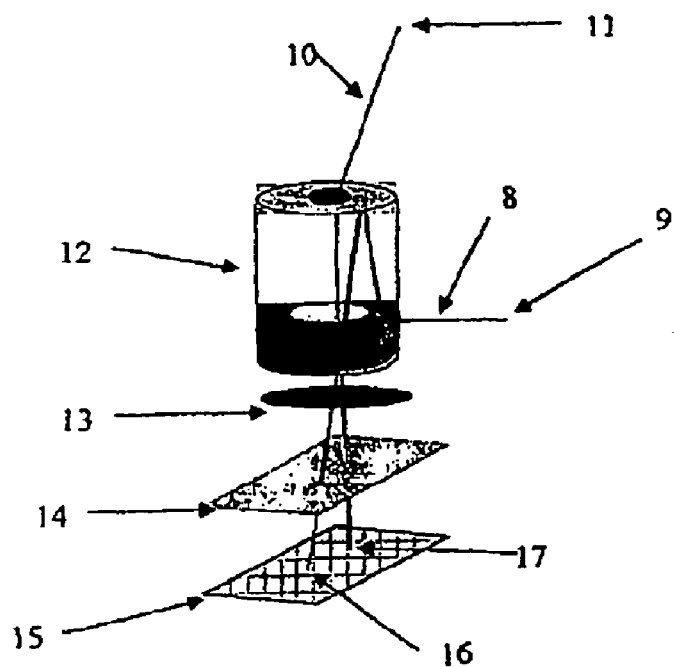
FIG. 2 is a schematic illustration of an imaging device which provides a nearly spherical field of view and the optical path of a light beam traveling within the imaging device.

FIG. 2 illustrates detection of radiation (8) originating at a first radiation source (9) and radiation (10) originating at a second radiation source (11). The figure demonstrates an omni-directional lens assembly (12) which provides a nearly spherical field of view. By using this kind of lens assembly, it is possible to detect radiation sources or objects located within a cylindrical field of view around the imaging device, as well as radiation sources or objects located above the imaging device. The radiation (8) originating at the first radiation source (9) is reflected inside the lens assembly (12) towards a focusing lens (13), an optical filter (14) and a Focal Plane Array (15) and is detected by a sensor element or a group of sensor elements (16) on the Focal Plane Array (15). The radiation (10) originated at the second radiation source (11) penetrates the lens assembly (12) from above, passing through the lens assembly (12), the focusing lens (13), being filtered by the optical filter (14) and being detected by a sensor element or a group of sensor elements (17) on the Focal Plane Array (15).

Figure 3:
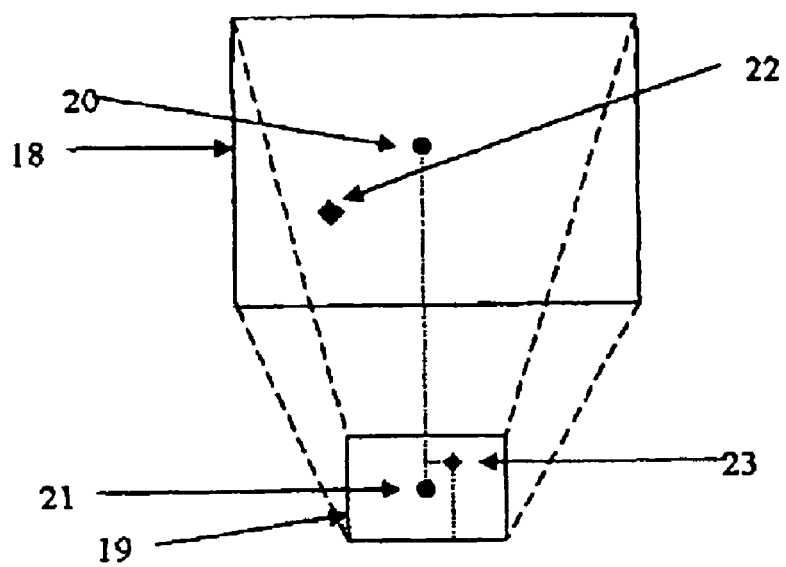
FIG. 3 is a simplified schematic illustration of prior art, used to determine azimuth and elevation angles of an object imaged by a narrow-angle imaging system.

FIG. 3 is a schematic illustration of prior art, according to which azimuth and elevation angles are determined. This figure refers to imaging systems which enable a conventional, narrow-angle field of view. A scene (18) is imaged by a Focal Plane Array (19). It is stressed that the Focal Plane Array (19) is part of an entire imaging system, however, in order to simplify the explanation, reference is made only to the Focal Plane Array (19). The image produced by the Focal Plane Array (19) is that of a relatively narrow field of view. It is assumed that the size, in terms of angles, of the field of view covered by the imaging device, is known and that the number of sensor elements per line and per column on the Focal Plane Array is also known.

Given this information, it is easy to determine how many sensor elements per column cover a single degree of elevation and how many sensor elements per line cover a single degree in azimuth. Each sensor element on the Focal Plane Array (19) is assigned a coordinate which specifies its line number and column number. A point (20) in the scene is selected, with respect to which, the center (21) of the Focal Plane Array is neither elevated nor depressed or shifted in azimuth. An object (22) in the scene appears on a sensor element (23) on the Focal Plane Array. Elevation and azimuth angles of the object (22) need to be determined. Since the coordinates of the sensor element (23) that images the object (22) are known, and the coordinates sensor element which coincides with the center (21) of the Focal Plane Array (19) are also known, it is easy to determine the distance of the sensor element (23) from the sensor element that coincides with the center (21) on the Focal Plane Array (19). It is also known how many sensor elements per line and how many sensor elements per column cover a degree in space. All this information is easily used to determine the azimuth and elevation angles of the object (22). This well known method commonly used in prior art, is not applicable when imaging a full panoramic field of view, since such imaging devices incorporate reflective surfaces, which cause reflections and sometimes double reflections of the scene and distortions in ways other that in conventional imaging. The irregular reflection of the scene causes the image acquired by the focal plane array to have a unique shape, as illustrated below.

Figure 4:
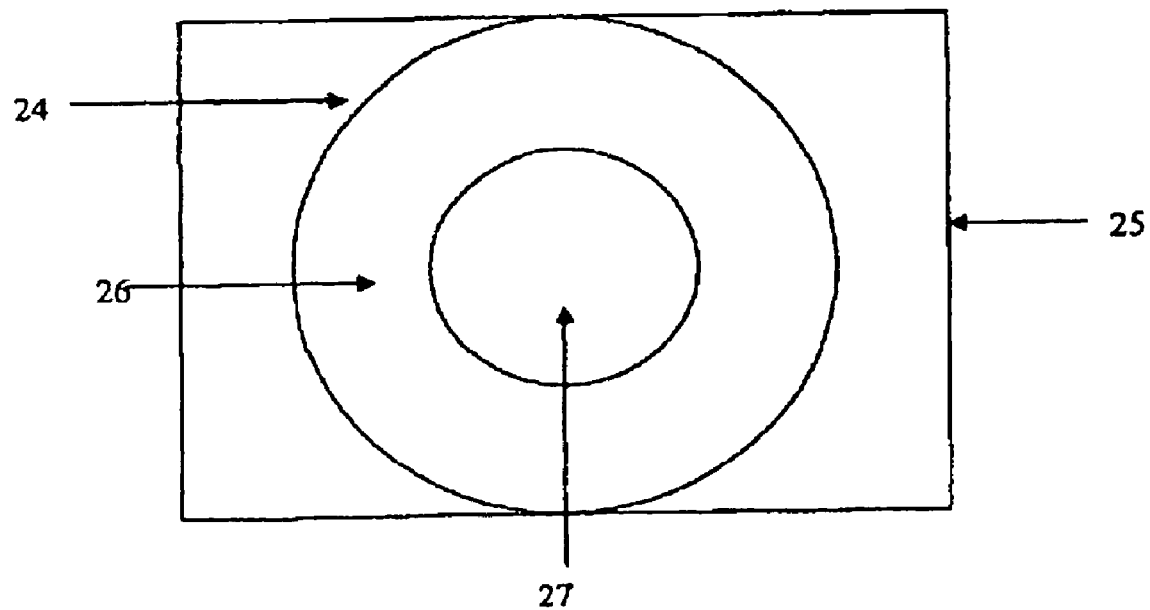
FIG. 4 is a schematic illustration of the unique shape of the image as acquired on the focal plane array of the imaging device.

FIG. 4 is a schematic illustration of the shape of the image created on a Focal Plane Array, when using an omni-directional imaging system, such as those illustrated in FIGS. 1 and 2. In this figure, a circular image (24) is acquired by the Focal Plane Array (25). Those skilled in the art of omni-directional imaging would appreciate that the circular image (24) actually consists of an outer circle (26) and an inner circle (27). When imaging a cylindrical field of view, the outer circle (26) will image the cylindrical field of view and the inner circle (27) will image a reflection of the lens that is inside the imaging system. When imaging a nearly spherical field of view, the outer circle (26) will image the cylindrical field of view from around the imaging device, whereas the inner circle (27) will image the field of view above the imaging device.

Figure 5:
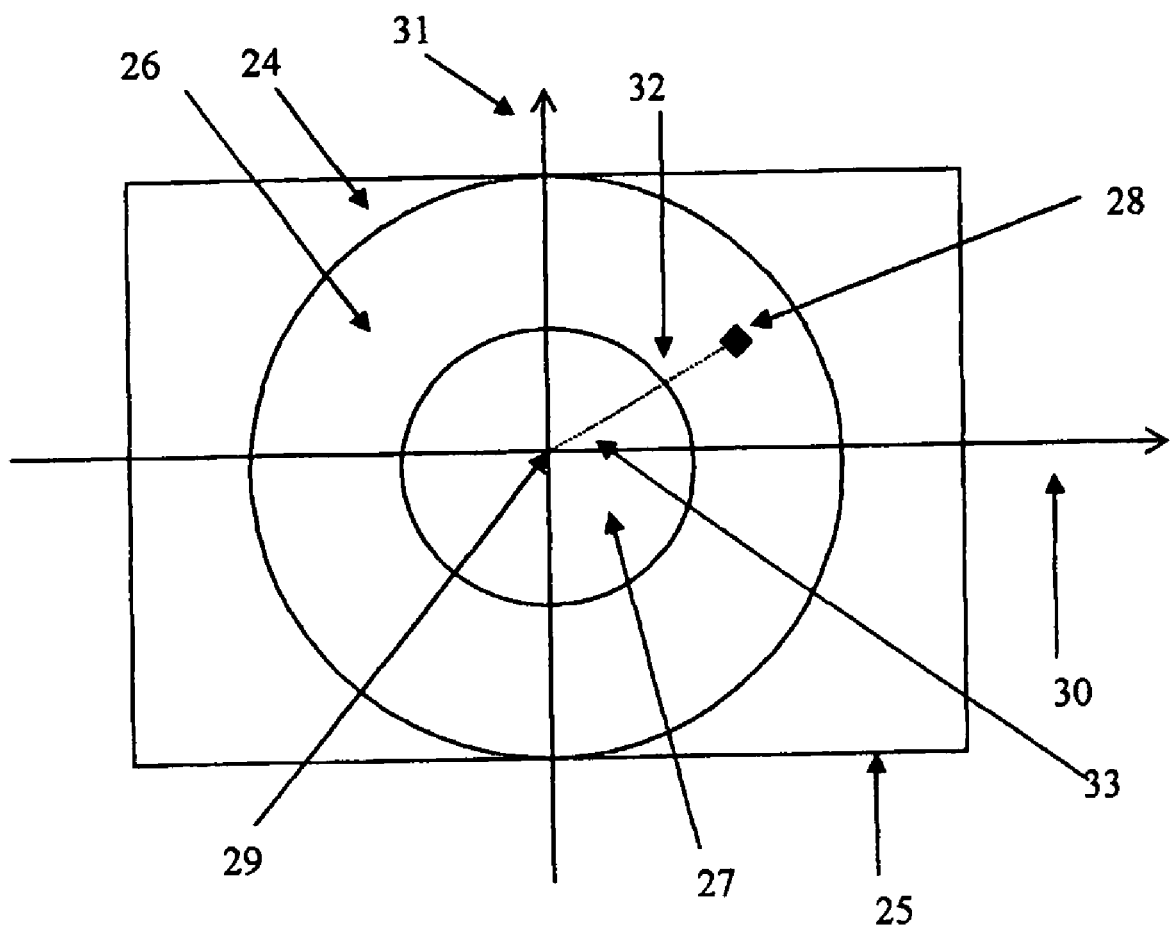
FIG. 5 is a schematic illustration of a method for determination of the azimuth and elevation angles of the object or radiation source that is imaged.

FIG. 5 illustrates the manner in which determination of azimuth and elevation angles is made when using an omni-directional imaging system.

This applies to objects located within the cylindrical field of view, imaged as the outer circle (26) on the focal plane array (25). In this figure, a sensor element (28) of the Focal Plane Array (25) images a radiation source or object located somewhere within an omni-directional scene.

For the purpose of illustration only it is assumed that the Focal Plane Array (25) is rectangular in shape and that the circular image (24) is located exactly at the center of the Focal Plane Array. The center (29) of the circular image (24) is determined and a virtual two dimensional coordinate system originates from that center, having an "X" axis (30) and a "Y" axis (31), is imposed on it, its origin coinciding with the center of the circular image (29).

The virtual coordinate system is rotated so that the "X" axis (30) is aligned with the true north. Each sensor on the Focal Plane Array (25) is assigned a coordinate specifying its line number and column number.

To determine the azimuth angle of an object or radiation source that is imaged by a sensor (28) of the Focal Plane Array (25):

A virtual line (32) is formed, which connects the sensor element coinciding with the center of the circular image (29) with the sensor element (28) which images the object of interest. Given the coordinates of the two said sensors, and by using conventional trigonometry, the angle (33) between that line and any of the axes can be determined. To determine the elevation angle of an object or radiation source that is imaged by a sensor element (28) on the Focal Plane Array (25):

A virtual line (32) is formed, which connects the sensor element coinciding with the center of the circular image (29) with the sensor element (28) which images the object of interest. Given the coordinates of the two sensors, it is easy to determine the length of the virtual line (32) that connects them. The length of the virtual line (32) is used in a transformation function. The transformation function assigns each "length" value, a corresponding elevation angle. The transformation function is designed according to the specific design and parameters of the omni-directional lens assembly and layout of the imaging system.

Those skilled in the art would appreciate that the transformation function is a product of the detailed optical design of the lens assembly. Since this invention does not refer to optical design parameters, and is not intended to serve as a guide in the process of optical design, no further reference is made to the transformation function. It is stressed however, that although the transformation function is needed for proper determination of elevation angles, this function varies according to the specific design of the lens assembly, and is considered as given information to those skilled in the art of optical design.

It is further important to notice that the transformation function should produce different values according to the position of the imaging system itself. More explicitly, if the imaging system itself it tilted (in elevation or in azimuth), the tilt angle is needed in order to produce a true result regarding positions of objects that appear in the image.

Referring to the current invention in general, it is stressed that although reference was made to several kinds of omni-directional imaging systems, including both cylindrical filed of view imaging devices and nearly spherical field of view imaging devices, the azimuth and elevation measurement methods described hereby refer only to objects appearing in the field of view acquired by the focal plane array after reflection, which is the cylindrical field of view.

It is important to note that the nearly spherical field of view imaging device, produces two different image sectors on the Focal Plane Array. One image sector, referred to in FIG. 5 as the outer circle (26) comprises the cylindrical field of view which is generated after reflection. The other image sector, referred to as the inner circle (27) comprises a landscape from above the imaging system, which is imposed as direct light through optical lenses and not as reflections from reflective surfaces. Therefore, when implementing this method, it should be noticed, that the implementation is performed on image sectors that are acquired only after reflection, normally—by a round mirror of axi-symmetrical shape.

What is claimed is:

1. A method for determination of at least one of azimuth and elevation of an object, the method comprising:
   providing an imaging assembly including a lens assembly having a circumferential field of view and a multi-element focal plane sensor array associated with lens assembly for receiving light from said lens assembly and providing image information representing objects located within said circumferential field of view; and
   employing a transformation function which assigns the location of each element in said multi-element focal plane sensor array to a given range of azimuth and elevation angles relative to said focal plane sensor array to indicate at least one of azimuth and elevation for objects in said circumferential field of view.

2. A method according to claim 1 and wherein said providing an imaging assembly comprises:
   providing an imaging assembly including a lens assembly having a circumferential field of view and comprising a reflective element assembly having a circumferential field of view and a focusing lens;
   providing radiation from circumferential field of view to reflective element assembly, and focusing radiation reflected by mirror assembly on said focusing lens.

3. A method according to claim 1 and wherein said employing a transformation function comprises:
   providing an electronic circuit associated with multi-element focal plane sensor array; and
   utilizing electronic circuit to detect charge changes on multi-element focal plane sensor array and to register information identifying at least one sensor element of multi-element focal plane sensor array in which charge change occurred.

4. A method according to claim 1 and wherein said employing a transformation function comprises:
   providing software associated with multi-element focal plane sensor array; and
   utilizing software to detect charge changes on multi-element focal plane sensor array and to register information identifying at least one sensor element of said multi-element focal plane sensor array in which charge change occurred.

5. A method according to claim 1 and also comprising obtaining a circular image from multi-element focal plane sensor array, said circular image including first and second circular images.

6. Apparatus for determination of at least one of azimuth and elevation of an object comprising:
   an imaging assembly including a lens assembly having a circumferential field of view and a multi-element focal plane sensor array associated with lens assembly for receiving light from lens assembly and providing image information representing objects located within circumferential field of view; and
   processing circuitry including software employing a transformation function which assigns the location of each element in multi-element focal plane sensor array to a given range of azimuth and elevation angles relative to focal plane sensor array to indicate at least one of azimuth and elevation for objects in circumferential field of view.

7. Apparatus according to claim 6 and wherein lens assembly comprises a reflective element assembly having a circumferential field of view and a focusing lens, mirror assembly being operative to reflect radiation received from a source of radiation onto focusing lens.

8. Apparatus according to claim 7 and wherein said reflective element assembly includes at least one reflective surface.

9. Apparatus according to claim 7 and wherein said reflective element assembly includes at least one reflective lens.

10. Apparatus according to claim 6 and wherein imaging assembly also comprises at least one optical filler element disposed upstream of said multi-element focal plane sensor array and being operative to allow passage into the lens assembly of radiation at a predetermined range of wavelengths.

11. Apparatus according to claim 6 and wherein said radiation in a predetermined range of wavelengths comprises radiation at visible wavelengths.

12. Apparatus according to claim 6 and wherein multi-element focal plane sensor array comprises a CCD.

* * * * *